(12) United States Patent
Butler et al.

(10) Patent No.: US 8,502,816 B2
(45) Date of Patent: Aug. 6, 2013

(54) TABLETOP DISPLAY PROVIDING MULTIPLE VIEWS TO USERS

(75) Inventors: David Alexander Butler, Cambridge (GB); Stephen Edward Hodges, Cambridge (GB); Shahram Izadi, Cambridge (GB); Nicolas Villar, Cambridge (GB); Stuart Taylor, Cambridge (GB); David Molyneaux, Oldham (GB); Otmar Hilliges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 12/959,055

(22) Filed: Dec. 2, 2010

(65) Prior Publication Data

US 2012/0139897 A1 Jun. 7, 2012

(51) Int. Cl.
*G06T 15/00* (2006.01)
(52) U.S. Cl.
USPC ............... 345/419; 362/558; 359/463; 345/6; 345/653; 345/424

(58) Field of Classification Search
None
See application file for complete search history.

(56) References Cited

U.S. PATENT DOCUMENTS

| | | | |
|---|---|---|---|
| 3,647,284 A | 3/1972 | Elings et al. |
| 4,843,568 A | 6/1989 | Krueger et al. |
| 5,644,369 A | 7/1997 | Jachimowicz et al. |
| 5,754,147 A | 5/1998 | Tsao et al. |
| 6,415,050 B1 | 7/2002 | Stegmann et al. |
| 6,487,020 B1 | 11/2002 | Favalora |
| 6,554,430 B2 | 4/2003 | Dorval et al. |
| 6,765,566 B1 | 7/2004 | Tsao |
| 6,775,014 B2 | 8/2004 | Foote et al. |
| 6,806,849 B2 | 10/2004 | Sullivan |
| 7,134,080 B2 | 11/2006 | Kjeldsen et al. |
| 7,190,518 B1 | 3/2007 | Kleinberger et al. |
| 7,239,293 B2 | 7/2007 | Perlin et al. |

(Continued)

FOREIGN PATENT DOCUMENTS

| | | |
|---|---|---|
| EP | 1852768 A2 | 11/2007 |
| WO | WO2005069641 A1 | 7/2005 |

OTHER PUBLICATIONS

U.S. Appl. No. 11/604,491, filed Nov. 27, 2006.
U.S. Appl. No. 11/746,397, filed May 9, 2007.

(Continued)

*Primary Examiner* — Alexander S Beck
*Assistant Examiner* — Ibrahim Khan
(74) *Attorney, Agent, or Firm* — Zete Law, P.L.L.C.; MacLane C. Key

(57) ABSTRACT

A tabletop display providing multiple views to users is described. In an embodiment the display comprises a rotatable view-angle restrictive filter and a display system. The display system displays a sequence of images synchronized with the rotation of the filter to provide multiple views according to viewing angle. These multiple views provide a user with a 3D display or with personalized content which is not visible to a user at a sufficiently different viewing angle. In some embodiments, the display comprises a diffuser layer on which the sequence of images are displayed. In further embodiments, the diffuser is switchable between a diffuse state when images are displayed and a transparent state when imaging beyond the surface can be performed. The device may form part of a tabletop comprising with a touch-sensitive surface. Detected touch events and images captured through the surface may be used to modify the images being displayed.

20 Claims, 10 Drawing Sheets

U.S. PATENT DOCUMENTS

| | | | |
|---|---|---|---|
| 7,677,732 | B2 | 3/2010 | Moro et al. |
| 2002/0084951 | A1 | 7/2002 | McCoy |
| 2004/0192430 | A1 | 9/2004 | Burak et al. |
| 2005/0052427 | A1 | 3/2005 | Wu et al. |
| 2005/0064936 | A1 | 3/2005 | Pryor |
| 2005/0152156 | A1* | 7/2005 | Favalora et al. ............. 362/558 |
| 2006/0007124 | A1 | 1/2006 | Dehlin |
| 2006/0010400 | A1 | 1/2006 | Dehlin et al. |
| 2006/0036944 | A1 | 2/2006 | Wilson |
| 2006/0244918 | A1* | 11/2006 | Cossairt et al. ............... 353/7 |
| 2007/0046643 | A1 | 3/2007 | Hillis et al. |
| 2007/0201863 | A1 | 8/2007 | Wilson et al. |
| 2007/0291035 | A1 | 12/2007 | Vesely et al. |
| 2008/0029691 | A1 | 2/2008 | Han |
| 2008/0231926 | A1 | 9/2008 | Klug et al. |
| 2009/0237576 | A1 | 9/2009 | Nelson et al. |
| 2010/0149182 | A1 | 6/2010 | Butler et al. |
| 2010/0315413 | A1* | 12/2010 | Izadi et al. ................... 345/419 |

OTHER PUBLICATIONS

U.S. Appl. No. 12/023,582, filed Jan. 31, 2008.

Blundell, et al., Creative 3-D Display and Interaction Interfaces: A Trans-Disciplinary Approach, Wiley and Sons, 2006.

Blundell, Enhanced Visualization: Making Space for 3-D Images, Wiley and Sons, 2007.

Cao, et al., "Multi-User Interaction using Handheld Projectors", retrieved on Jul. 30, 2010 at <<http://citeseerx.ist.psu.edu/viewdoc/download?doi=10.1.1.91.9596&rep=rep1&type=pdf>>, ACM, Proceedings of Symposium on User Interface Software and Technology (UIST), Newport, Rhode Island, Oct. 2007, pp. 43-52.

Clark, "3D Without Glasses, That's Crazy Talk!", retrieved on Jul. 30, 2010 at <<http://www.wegotserved.com/2010/11/3d-glasses-crazy-talk/>>, We Got Served, 2007 pp. 1-7.

Dodgson, "Autostereoscopic 3D Displays", retrieved on Jul. 30, 2010 at <<http://ieeexplore.ieee.org/stamp/stamp.jsp?arnumber=01492263>>, IEEE Computer Society, Computer Journal, vol. 38, No. 8, Aug. 2005, pp. 31-36.

"Glasses-Free Tabletop 3D Display for omnidirectional viewing by multiple viewers has been successfully developed—Floating virtual 3D objects appearing on a flat tabletop surface-", retrieved on Jul. 30, 2010 at <<http://www2.nict.go.jp/pub/whatsnew/press/h22/100701/100701_e.html#link02>>, NICT, Jul. 1, 2010, pp. 1-5.

Grabham, "SecondLight explained: MS Surface on steroids, We get hands on with Microsoft's 3D interface and display", retrieved on Jul. 30, 2010 at <<http://www.techradar.com/news/computing/secondlight-explained-ms-surface-on-steroids-598017>>, Techradar, May 11, 2009, pp. 1-2.

Izadi et al., "C-State: A Multi-Touch and Object Recognition System for Remote Collaboration Using Horizontal Surfaces", IEEE, 2007, pp. 8.

Jones, et al., "Rendering for an Interactive 360 degrees Light Field Display", retrieved on Jun. 18, 2008 at <<http://gl.ict.usc.edu/Research/3DDisplay/>>, SIGGRAPH 2007 Papers Proceedings SIGGRAPH 2007 Emerging Technologies, 3 pages.

Jones, et al., "Rendering for an Interactive 360 degree Light Field Display", retrieved on Jul. 30, 2010 at <<http://gl.ict.usc.edu/Research/3DDisplay/>>, University of Southern California, ICT Graphics Lab, 2007, pp. 1-4.

Malik, et al., "Visual Touchpad: A Two-handed Gestural Input Device", ACM, 2004, pp. 8.

Mirage by OPTI-GONE International, retrieved on the internet on Jan. 13, 2009 at <<http://www.optigone.com>>.

Non-Final Office Action for U.S. Appl. No. 12/336,963, mailed on Aug. 17, 2011, David Butler, "Volumetric Display System Enabling User Interaction", 20 pages.

"Pure Depth" <<http://www.puredepth.com/sub_tech_what.html>>, p. 1.

Reinhart, et al., "A Projection-based User Interface for Industrial Robots", retrieved on Jun. 18, 2008 at <<http://ieeexplore.ieee.org/iel5/4373911/4373912/04373930.pdf?tp=&isnumber=4373912&arnumber=4373930&htry=3>>, VECIMS 2007—IEEE International Conference on Virtual Environments, Human-Computer Interfaces, and Measurement Systems, Ostuni, Italy, Jun. 25-27, 2007, pp. 67-71.

Robinett, et al., "The Visual Display Transformation for Virtual Reality", retrieved on Jun. 18, 2008 at <<http://www.cs.jhu.edu/~cohen/VirtualWorlds/media/pdf/Robinett_Holloway_94-031.pdf>>, TR94-031, Sep. 1994, 30 pages.

"Volumetric display", retrieved on Jun. 18, 2008 at <<http://en.wikipedia.org/wiki/Volumetric_display>>, Wikipedia, the free encyclopedia, 4 pages.

Wellner, "Interacting with Paper on the Digitaldesk", ACM, vol. 36, No. 7, 1993, pp. 87-96.

Wilson, "PlayAnywhere: A Compact Interactive Tabletop Projection-Vision System", ACM, 2005, p. 10.

Wilson, "TouchLight: An Imaging Touch Screen and Display for Gesture-Based Interaction", ACM, 2004, pp. 8.

Wu, et al., "Multi-Finger and Whole Hand Gestural Interaction Techniques for Multi-User Tabletop Displays", ACM, vol. 5, Issue 2, 2003, pp. 193-202.

* cited by examiner

TABLETOP DISPLAY PROVIDING MULTIPLE VIEWS TO USERS

BACKGROUND

Traditionally users have interacted with computers using a keyboard and mouse; however the use of touch input is becoming increasingly popular, particularly for portable devices such as smart phones and tablet computers. Larger form factor devices which enable touch input by users have also been developed and such devices include surface computing devices. Surface computing devices enable a user to interact directly with digital content displayed on a large horizontal display (in a tabletop form factor) using multiple fingers (multi-touch input). These devices provide a user with a standard two-dimensional (2D) display in a similar manner to that provided by desktop computing devices.

3D displays are available in the form of computer monitors and 3D televisions and although many of these require viewers to use special eyewear (e.g. such that each eye receives a different image), displays have been developed which do not require this and are hence referred to as 'auto-stereoscopic'.

The embodiments described below are not limited to implementations which solve any or all of the disadvantages of known surface computing devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A tabletop display providing multiple views to users is described. In an embodiment the display comprises a rotatable view-angle restrictive filter and a display system. The display system displays a sequence of images synchronized with the rotation of the filter to provide multiple views according to viewing angle. These multiple views provide a user with a 3D display or with personalized content which is not visible to a user at a sufficiently different viewing angle. In some embodiments, the display comprises a diffuser layer on which the sequence of images are displayed. In further embodiments, the diffuser is switchable between a diffuse state when images are displayed and a transparent state when imaging beyond the surface can be performed. The device may form part of a tabletop comprising with a touch-sensitive surface. Detected touch events and images captured through the surface may be used to modify the images being displayed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Existing 3D displays, such as 3D televisions and computer monitors, whether auto-stereoscopic or requiring a user to wear special glasses, are not suitable for integration into surface computing devices as they are not touch-sensitive and so do not enable touch input by a user. Additionally, most auto-stereoscopic displays are also not suitable for integration into surface computing devices because they are designed to be oriented vertically in one particular orientation (often landscape) such that viewers are looking substantially perpendicularly at the display screen. If placed horizontally, such devices cannot be viewed correctly by users positioned in many locations around the edge of the display.

Figure 1:
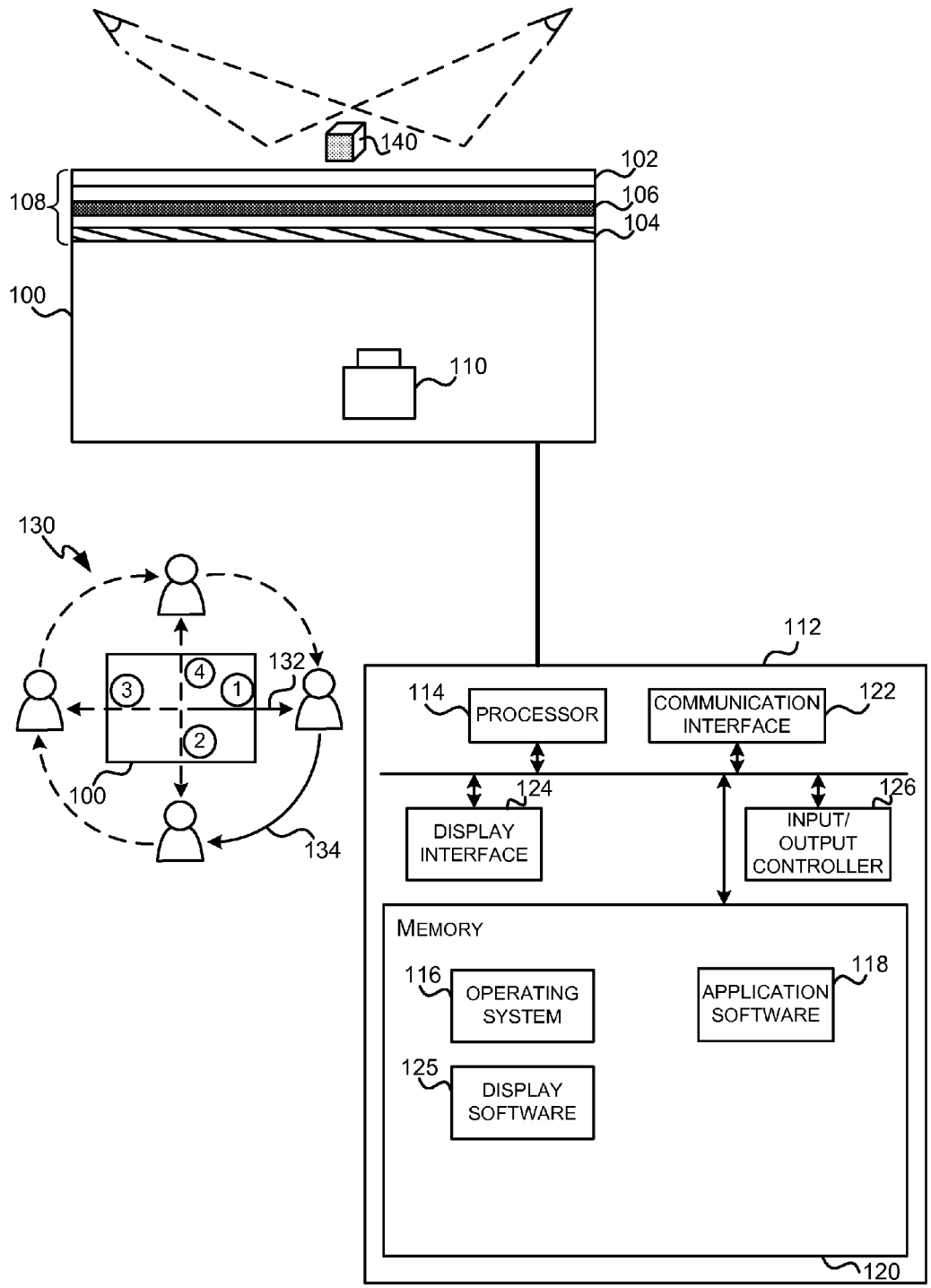
FIG. 1 is a schematic diagram of a tabletop display device.

FIG. 1 is a schematic diagram of a tabletop display which provides multiple views to users located anywhere around the device and hence may be referred to as a 'multiview display'. This display may be used to provide a view-angle dependent image to users and this view-angle dependency may be exploited to provide an auto-stereoscopic 3D surface computing experience to users and/or to provide personalized views to the different users. The device 100 comprises a substantially horizontal surface 102, a diffuser layer 104 and a rotatable view-angle restrictive filter 106 which is rotated in a horizontal plane in use (i.e. in a plane parallel to the upper surface 102 of the device) and is located within the tabletop surface 108. In the embodiment shown in FIG. 1 the rotatable view-angle restrictive filter 106 is located between the tabletop surface 102 and the diffuser layer 104. The device further comprises a display system 110 (which depending on the technology used may be in a different position to that shown in FIG. 1). The display device 100 is connected to computing hardware and software 112. The elements within the device 100 are described in more detail below.

An example of the operation of the tabletop display 100 can be described with reference to the flow diagram in FIG. 2. The view-angle restrictive filter 106 is rotated in a plane parallel to the tabletop surface 102 (block 201) and a sequence of images are displayed using the display system 110 in synchronization with the rotation of the filter (block 202). This synchronization can be explained with reference to diagram 130 in FIG. 1 which to reduce complexity, shows only four viewing positions (labeled 1-4). When the filter 106 is in position 1 (as shown by arrow 132 in FIG. 1) and the display system 110 projects image 1. As the filter rotates (in block 201, as indicated by arrow 134 in FIG. 1), the display system 110 then proceeds to display image 2 when the filter is in position 2, image 3 when the filter is in position 3 and image 4 when the filter is in position 4. By repeating the process at sufficient speed (e.g. above the threshold for flicker perception) each viewer sees a continuous view-specific display. The view-specific displays can be used to present different information to different users (and various example applications of this are described in more detail below). By increasing the number of viewing positions (e.g. by using a filter with a narrower view-angle and increasing the number of different images displayed) such that a user sees a different image (in each cycle) with their left and right eyes, the device can provide an auto-stereoscopic 3D display (as indicated by the cube 140 shown in FIG. 1) to users at any position around the display.

The rotatable view-angle restrictive filter 106 within the tabletop surface 108, which rotates in use, ensures that at any instant, the displayed image can only be seen from a limited viewing angle. Such filters may alternatively be referred to as 'parallax barriers' or 'parallax elements'. Depending on the implementation, and in particular on the number of viewing angles for which different images are provided, there may be different requirements on the viewing angle provided by the filter. In the example shown in FIG. 1 where there are only 4 viewing angles, a filter may be required which provides a viewing angle of 90° or less. In an example where the device 100 provides an auto-stereoscopic 3D display, a narrow viewing angle is required, i.e. an angle which is small enough that viewers will see a different image in their left and right eyes. The angle required will depend upon the specific implementation as it depends on the intended distance between the display and the users for 3D viewing (the greater the distance, the narrower the required angle) and in an example an angle of less than 2° may be used.

Figure 8:
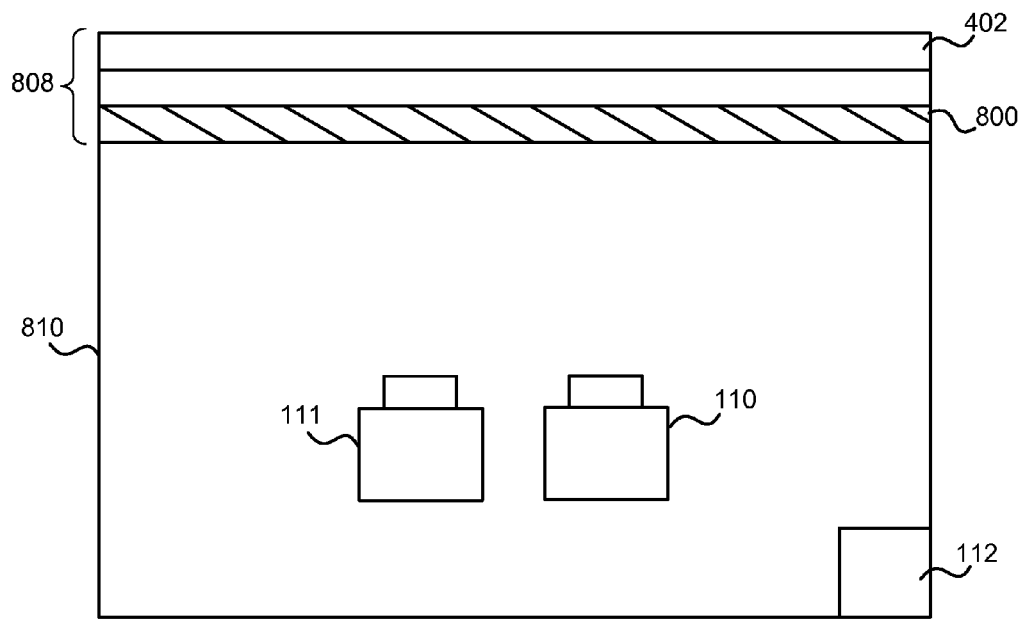
FIGS. 8 and 10 are schematic diagrams of further example tabletop computing devices.
Figure 8:
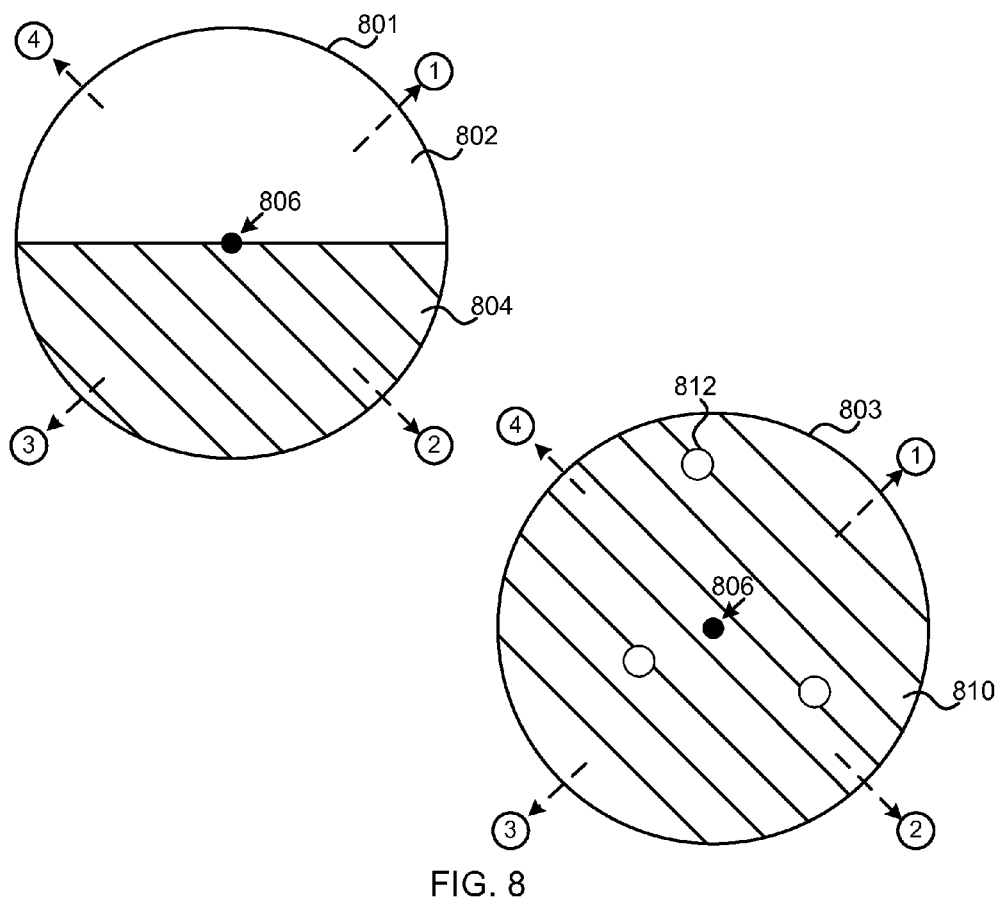

Although may of the examples of parallax barriers (or view-angle restrictive filters) described herein display all pixels of a complete image simultaneously to a specific view direction (e.g. to a particular viewer) this is by way of example only and parallax barriers may be used which are of different design and which for any specific direction only show part of the image at any time and further parts of the image at a time in the future. An example of such a parallax barrier is a spinning thin spiral aperture which would enable sub-parts of the image to be shown in different directions, presenting only a sub-part of an image in one direction and a sub-part of an image in a different direction. Over time a viewer at a specific direction would see a complete image "scanned" by the presentation of such sub-parts quickly. Another example is shown in FIG. 8 and described below.

The view-angle restrictive filter 106 may be implemented as a mechanically rotatable filter or may use some form of electro-optic directional (e.g. holographic) filter. Examples of filters which may be mechanically rotated include filters comprising an array of parallel slits or vanes, which may also be referred to as microlouver filters or privacy film/filters (e.g. as provided by 3M™), and optical elements comprising lenticular lenses. Where louvers or vanes are used, these may be substantially non-reflecting and light absorbing to ensure that there are no stray reflections. Where a microlouver filter is used, the vanes may be oriented vertically, at a fixed angle to vertical which is the same across the entire filter, or at an angle to vertical which may taper or change across the extent of the filter in order to provide the desired view restriction.

Figure 3:
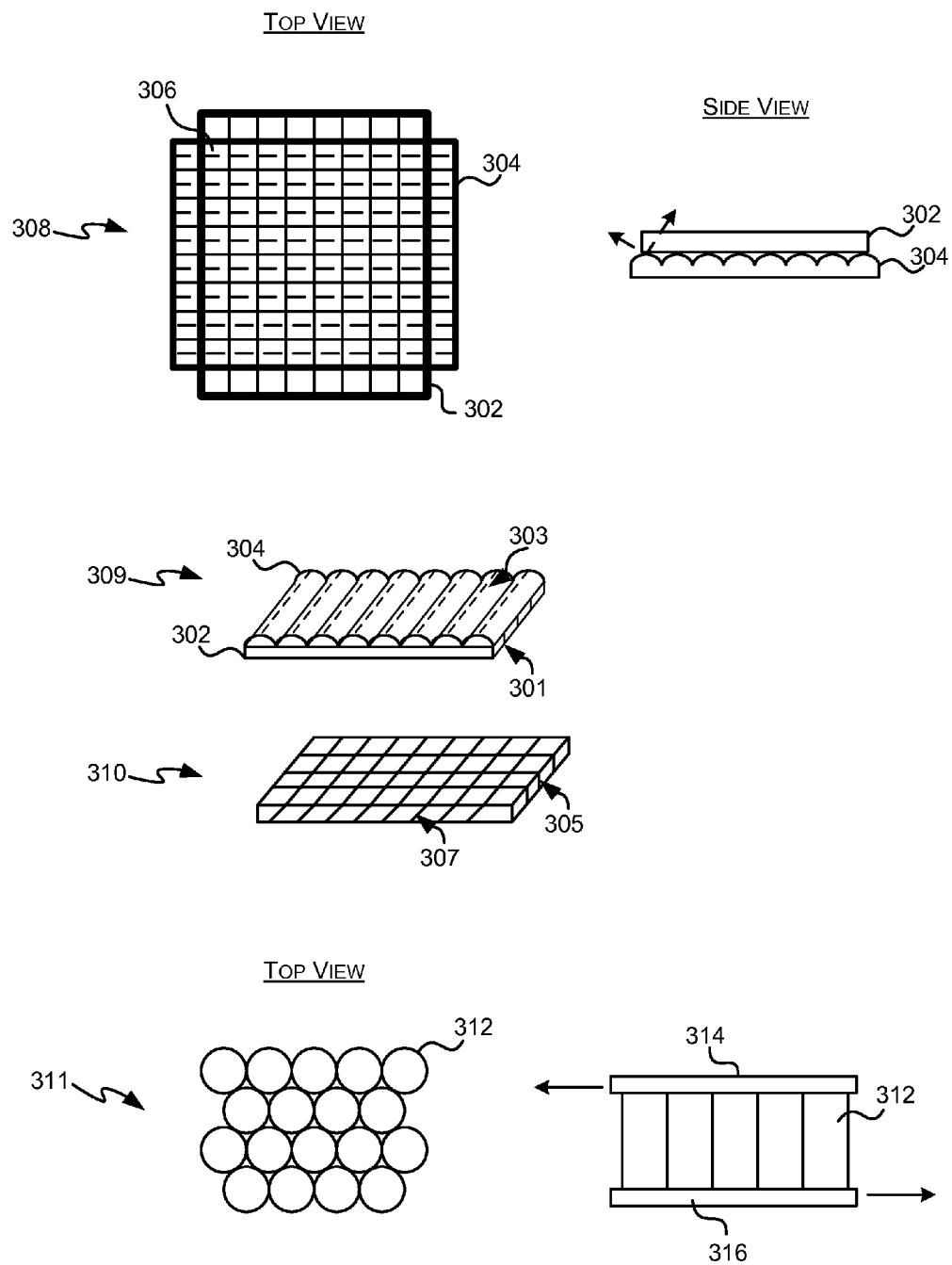
FIG. 3 shows schematic diagrams of example view-angle restrictive filters.

In an example, a combination of a microlouver filter 302 and a lenticular lens array 304 may be used, as shown in FIG. 3. By arranging the filter 302 such that the vanes 301 are orthogonal to the ridges 303 (indicated by dotted lines on the diagrams of both combined structures 308, 309) of the lens array 304 and projecting two pixels onto each element 306 in the combined structure 308, 309 (and with appropriate alignment between the pixels and the lens array) different images may be viewed simultaneously by two users opposite each other (e.g. users in viewing positions 1 and 3 in the example of FIG. 1) and this can be used to double the frame rate displayed to a user for a given speed of rotation of the filter. In other examples, more than two pixels may be projected onto each element such that more than two different views may be provided to accommodate different viewing heights (e.g. a user standing at viewing position 1 may see a different view to someone who is sitting at position 1).

As illustrated by the examples 308, 309 shown in FIG. 3, the microlouver filter 302 may be above or below the lenticular lens array 304. In a further example 310 of a microlouver filter which ensures that two users opposite each other each see the correct image (i.e. the one intended for them and not the one intended for the user opposite them), the filter comprises two sets of vanes arranged orthogonally to each other. The first set of vanes 305 are oriented vertically and the second set of vanes 307 are angled to vertical.

FIG. 3 also shows an example of a mechanical view-restrictive filter 311 which comprises a honeycomb arrangement of flexible tubes or 'straws' 312, which may be referred to as light pipes. Like the vanes/louvers described above, the sides of the light pipes absorb light or are non-reflective to avoid stray reflections. The interior of each light pipe may be air, a vacuum or an optically transparent material. Use of a vacuum may be useful to reduce air friction for any rotating elements (and this is also applicable to any other rotating elements described in other examples). The top and bottom of each tube 312 is mechanically held in a top and bottom plane 314, 316 respectively in a manner by which the tubes are still free to be re-orientated. By moving the tubes held these planes in X and Y with respect to each other, the tubes 312 can be tilted to only permit viewing in a required direction and by moving the planes 314, 316 in a circular direction with respect to each other, the view-angle of the filter 311 can be rotated. The motion may be adapted as required to implement the required view visibility pattern. While these tubes 312 are shown has having a circular cross-section, it will be appreciated that this is by way of example only and the tubes may alternatively have a different shape in cross-section (e.g. hexagonal tubes). The views may be presented as a circular arrangement (circle) or as nested circles (different vertical parallaxes) or as a spiral (giving a spiral of different view angles) or even discrete raster positions etc. Different arrangements may be desirable in the generation of images for the different views.

Where a mechanical filter is used which comprises vanes, tubes (e.g. as shown in FIG. 3) or other physical barriers, the filter may be vibrated (in addition to being rotated) in order to reduce any visual effect of the vanes 301/tubes 312 etc.

Examples of electro-optic directional filters which may be used to implement the view-angle restrictive filter 106 include photo-refractive materials (typically crystals such as lithium niobate or photo-refractive polymers) which can change their refractive index depending on the energy coupled into them by writing with a laser of a specific wavelength. Other examples include materials which can change refractive index depending on other externally applied forces, such as an electric field or acoustic wave. In an example implementation, any of these materials may be used as the view-angle restrictive filter 106 by dynamically reshaping the refractive index to simulate a rotating lenticular lens array.

The display system 110 may be a projection system which comprises one or more projectors and in the embodiment shown in FIG. 1 comprises a single high speed projector. The projection system may comprise any type of projector, such as an LCD, liquid crystal on silicon (LCOS), Digital Light Processing™ (DLP) or laser projector. The projector may be fixed or steerable. Where the projection system comprises more than one projector, the projectors may be of the same or different types. For example, the projection system may comprise projectors with different focal lengths, different operating wavelengths, different resolutions, different pointing directions etc. In some embodiments, switchable shutters (or filters) may be used in conjunction with the projectors, e.g. images from two projectors may be interleaved to produce a higher refresh rate and switchable shutters may be used in front of each projector to block projection from one of the projectors at any time.

In some embodiments, the display system 110 may comprise other display means, in addition to, or instead of a projector. In an example, the display system 110 may comprise an OLED (organic light emitting diode) display (which in some embodiments may be a transparent OLED display), or the display system 110 may comprise an LCD display. In another embodiment the projection system itself may rotate with a static set of apertures forming another kind of rotating parallax barrier. In an example, the display system 110 may comprise an OLED display located where the diffuser layer 104 is shown in FIG. 1 and the diffuser layer 104 may be omitted.

In the examples described herein, each of the sequence of images displayed by the display system 110 is specific to the particular viewing position (e.g. image 1 corresponds to a user in position 1) and each user sees a different image. These different images may include personalized information (which may be referred to as 'personal content') for each user or may be used to generate auto-stereoscopic 3D images. In the case that auto-stereoscopic 3D images are generated, each user will see two sets of images, one with each eye.

In some examples, some, all or part of the images projected for different viewing positions may be the same. In an example application, the images displayed may be a combination of a global image (i.e. an image which is displayed at all viewing positions) and a personalized (or view-specific) image for each viewing angle and these images may be combined in software prior to display. The global image may comprise a gaming surface (e.g. a board game playing surface or card table) and the view-specific images may comprise a player's cards or other playing pieces (e.g. tiles, tokens, play money etc) which are kept secret from other players of the game. In another application, the global image may comprise a shared workspace (e.g. in the form of a shared presentation, whiteboard etc) and the view-specific images may comprise a user's personal data, such as an email or instant messenger window.

Figure 4:
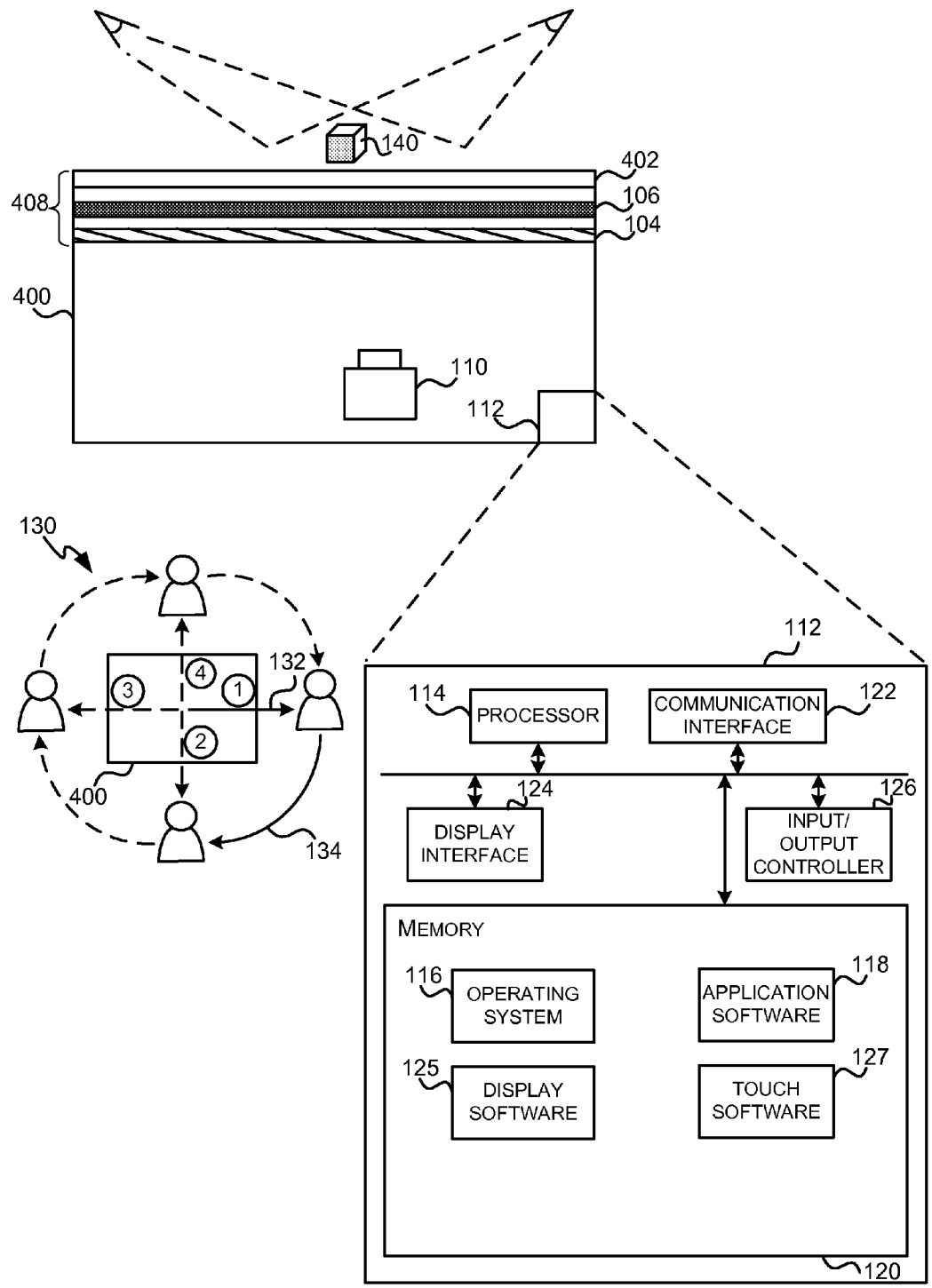
FIGS. 4 and 5 are schematic diagrams of example tabletop computing devices.

FIG. 4 is a schematic diagram of a surface or tabletop computing device which provides multiple views to users located anywhere around the device and which may be used to provide an auto-stereoscopic 3D surface computing experience to users. The device 400 comprises a substantially horizontal touch-sensitive surface 402 which provides touch based input functionality to the device, a diffuser layer 104 and a rotatable view-angle restrictive filter 106 which is rotated in a horizontal plane in use (i.e. in a plane parallel to the touch-sensitive surface 402) and is located within the tabletop surface 408 and in the embodiment shown in FIG. 4 is located between the touch-sensitive surface 402 and the diffuser layer 104. The device further comprises a display system 110 and computing hardware and software 112. Some of these elements have been described in more detail above (with reference to FIG. 1) and other elements within the device 400 are described in more detail below.

The term 'tabletop computing device' is used herein to refer to a computing device which comprises a substantially horizontal surface which is used both to display a graphical user interface and to detect input to the computing device. The surface may be planar or may be non-planar (e.g. curved, have a relief, or even spherical) and may be rigid or flexible. The input to the computing device may, for example, be through a user touching the surface or through use of an object (e.g. object detection or stylus input). Any touch detection or object detection technique used may enable detection of single contact points or may enable multi-touch input.

Figure 2:
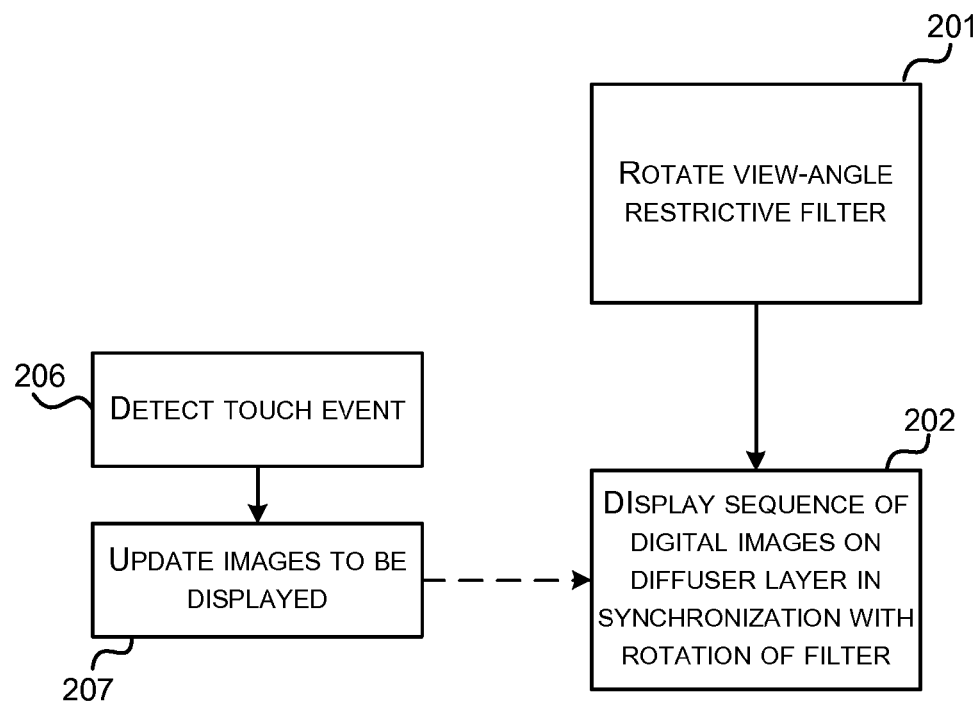
FIG. 2 is a flow diagram of an example method of operation of a tabletop display device or a tabletop computing device.

The operation of the tabletop computing device may be as shown in FIG. 2 and described above with the addition that the images which are displayed may be updated (in block 207) based on touch events which are detected (in block 206) on the touch-sensitive surface 402. As described above, the images displayed may comprise a combination of a global image and a view-specific image. Through touch input on the touch-sensitive surface 402, a user may be able to interact with either or both the global image and their view-specific image.

The touch-sensitive surface 402 may use any suitable technology to detect touch events (i.e. to detect objects in contact with the computing device, where the objects detected may be inanimate objects or may be part of a user's body, such as their hands or fingers) and examples include optical sensing, capacitive, inductive or resistive sensing. In an example, frustrated total internal reflection (FTIR) may be used for touch detection and in such an example, a camera (e.g. an infra-red camera) may be located below the diffuser 104 to detect touch events. In some examples, the view-restrictive filter 106 may be transparent to the infra-red light which is typically used for FTIR. FTIR provides true touch detection compared to using capacitive touch or other techniques which require thresholding to differentiate between a touch event and a finger hovering above the touch-sensitive surface.

Figure 5:
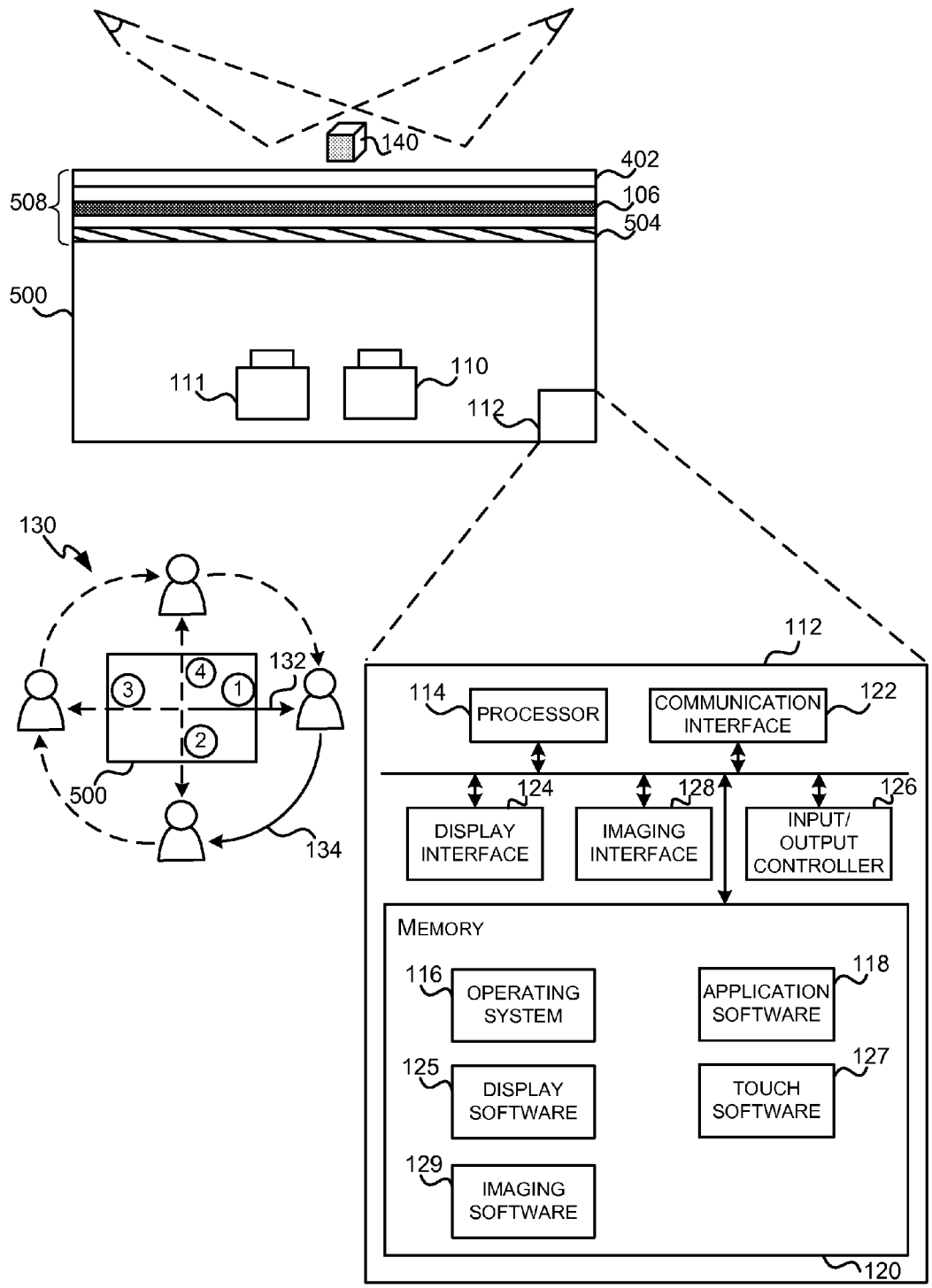

FIG. 5 is a schematic diagram of another surface or tabletop computing device which provides multiple views to users located anywhere around the device and which may be used to provide an auto-stereoscopic 3D surface computing experience to users. The device 500 comprises a substantially horizontal touch-sensitive surface 402 which provides touch based input functionality to the device, a switchable diffuser layer 504 which is switchable between a substantially diffuse state and a substantially transparent state and a rotatable view-angle restrictive filter 106 which is rotated in a horizontal plane in use (i.e. in a plane parallel to the touch-sensitive surface 402) and is located within the tabletop surface 508. In the embodiment shown in FIG. 5, the rotatable view-angle restrictive filter 106 is located between the touch-sensitive surface 402 and the switchable diffuser layer 504. The device further comprises a display system 110, an imaging system 111 and computing hardware and software 112. Some of the elements within the device 500 have been described above (with reference to FIGS. 1 and 4) and other elements are described in more detail below.

An example of the operation of the surface computing device 500 can be described with reference to the flow diagram in FIG. 6 and timing diagrams 71-74 shown in FIG. 7. To reduce the complexity of the diagrams shown, the timing diagrams are based on only four viewing positions 1-4 around the device 500 (as shown in the top down diagram 130 in FIG. 5). The timing diagrams 71-74 show the operation of the switchable diffuser layer 504 (timing diagram 71), the position of the rotatable view-angle restrictive filter 106 (timing diagram 72), the operation of the display system 110 (timing diagram 73) and the operation of the imaging system 111 (timing diagram 74) respectively.

With the diffuser layer 504 in its diffuse state (block 601), the display system 110 displays a sequence of digital images, one for each defined viewing position, in synchronization with the rotation of the rotatable view-angle restrictive filter 106 (blocks 201-202). At time 701, the filter 106 is in position 1 (as shown by arrow 132 in FIG. 5) and the display system 110 display image 1. As the filter rotates (as indicated by arrow 134 in FIG. 5), the display system 110 then proceeds to display image 2 when the filter is in position 2, image 3 when the filter is in position 3 and image 4 when the filter is in position 4. The display system 110 may then switch off and the diffuser layer 504 may be switched into its transparent state (block 603). During a subsequent rotation of the filter 106 (e.g. between times 702 and 703), the imaging system 111 captures one or more images through the surface (block 604). The images captured may, in some examples, correspond to the viewing positions 1-4; however in other examples, the image capture may not be synchronized with viewing positions. The process may then be repeated and by repeating the process at sufficient speed (e.g. above the threshold for flicker perception) each viewer sees a continuous display. The images captured (in block 604) are used to update the images displayed (block 205), although this updating may not be in real-time and may not be performed on each iteration of the method shown in FIG. 6. The images which are displayed may also be updated (in block 207) based on touch events which are detected (in block 206) on the touch-sensitive surface 402.

Figure 7:
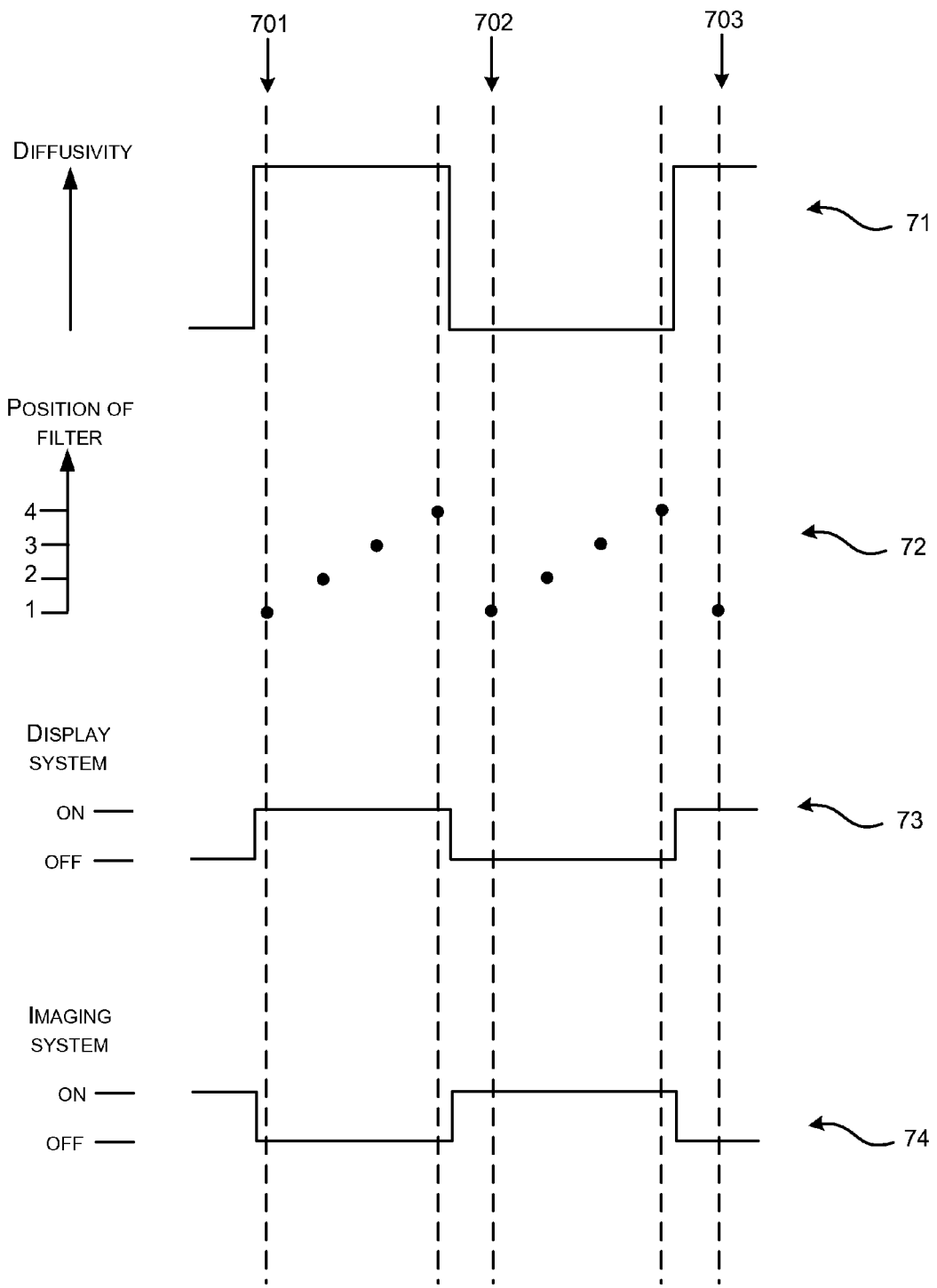
FIG. 7 shows example timing diagrams for the operation of a tabletop computing device.

It will be appreciated that the timing diagrams shown in FIG. 7 are by way of example only and the synchronized projection of images at the different viewing angles may be performed in a different order. For example, where the diffusing layer can be switched very fast, the projection and imaging for each position of the rotatable filter may be interlaced (e.g. project at viewing position 1, image at viewing position 2, project at viewing position 3, image at viewing position 4, . . . ).

Figure 6:
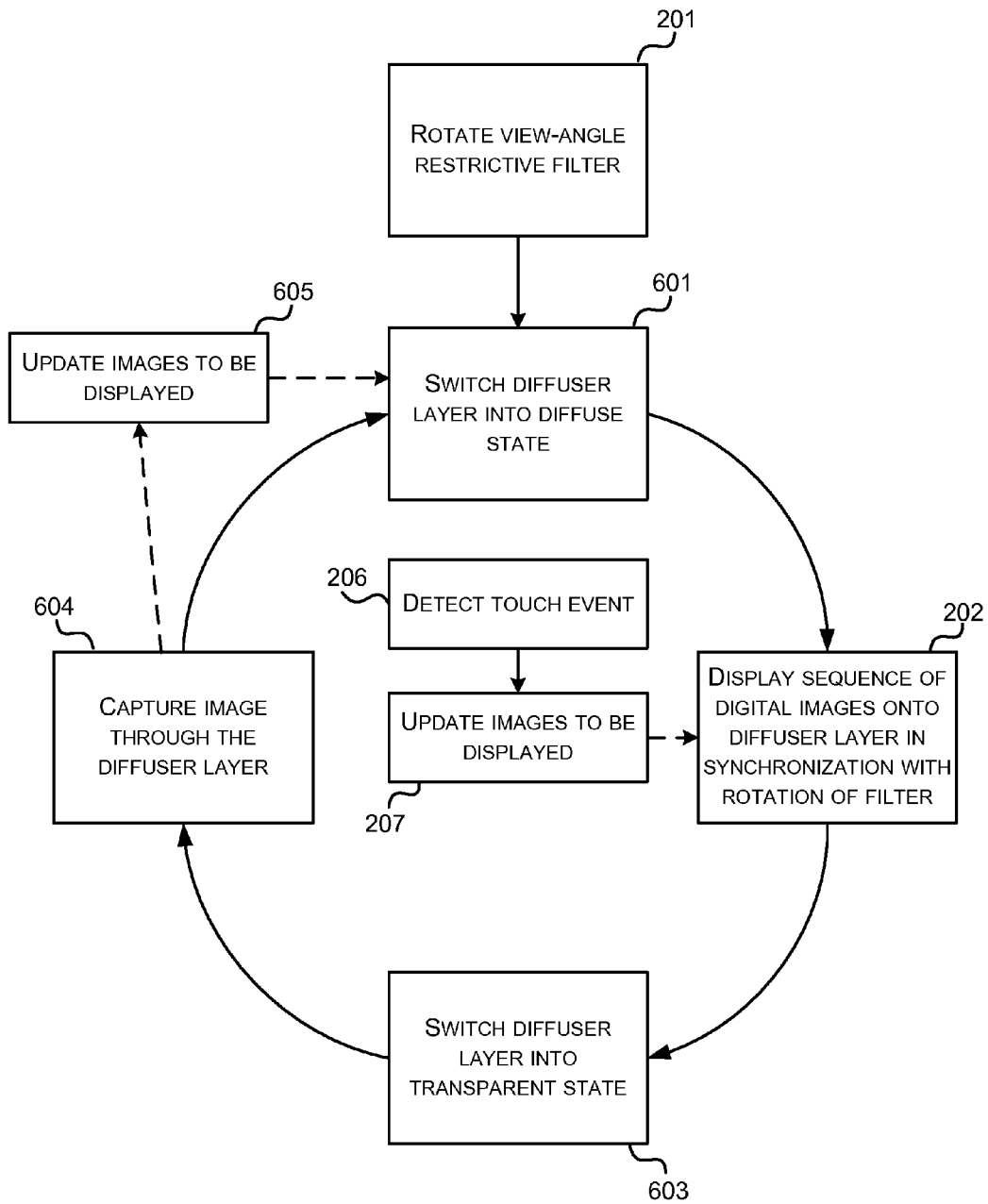
FIG. 6 is a flow diagram of an example method of operation of a tabletop computing device.

In the example method shown in FIG. 6 and timing diagram shown in FIG. 7, images are described as being captured by the imaging system 111 when the switchable diffuser 504 is in its clear (or transparent) state. In some examples, however, the imaging system may capture images when the switchable diffuser 504 is in its diffuse state (either instead of or in addition to capturing images in the clear state). These captured images may, for example, comprise shadows cast onto the tabletop computing device which may be used to adjust the displayed computer graphics with apparent shadows or for user/object detection. The captured images may also be used for touch detection (where FTIR is used, as described below).

The switchable diffuser layer 504 is switchable between a substantially diffuse state and a substantially transparent state. In its 'diffuse state' the layer is substantially diffusing and in its 'transparent state' the layer is substantially transparent, with the diffusivity of the layer being substantially higher in the diffuse state than in the transparent state. It will be appreciated that in the transparent state the layer may not be totally transparent and in the diffuse state the layer may not be totally diffuse. Furthermore, in some examples, only an area of the layer may be switched (or may be switchable). The switchable diffuser layer 104 may comprise a sheet of Polymer Stabilized Cholesteric Textured (PSCT) liquid crystal or Polymer Free Cholesteric Textured (PFCT) liquid crystal and such a sheet may be electrically switched between diffuse and transparent states by applying a voltage. PSCT is capable of being switched at rates which exceed the threshold for flicker perception. In an example, the switchable diffuser layer 504 may be switched at around 120 Hz. In another example, the switchable diffuser layer 504 may comprise a sheet of Polymer Dispersed Liquid Crystal (PDLC); however the switching speeds which can be achieved using PDLC are generally lower than with PSCT. Other examples of layers which can be switched between a diffuse and a transparent state include a gas filled cavity which can be selectively filled with a diffusing or transparent gas, and a mechanical device which can switch dispersive elements into and out of the plane of the layer (e.g. in a manner which is analogous to a Venetian blind). In all these examples, the layer can be electrically switched between a diffuse and a transparent state. Dependent upon the technology used to provide the layer, the switchable diffuser layer 504 may have only two states or may have many more states, e.g. where the diffusivity can be controlled to provide many states of different amounts of diffusivity.

The imaging system 111 comprises one or more cameras which may be arranged on axis (e.g. optical axis perpendicular to the tabletop surface 508, as shown in FIG. 5) or off-axis (e.g. where they may be aligned with the viewing positions) and in some examples, the cameras may rotate with the rotatable view-angle restrictive filter 106. The cameras may capture still images or moving images and in some examples the images captured may be synchronized with the angles at which images are displayed (e.g. viewing angles 1-4 as shown in FIGS. 5 and 7). Switchable shutters (or filters) may be used in front of the cameras in order to perform synchronization between image capture and viewing positions. In some embodiments, the display system 110 and imaging system 111 may be combined, e.g. in the form of an OLED sensor in pixel display. Such an arrangement, which avoids the use of a camera-based imaging system, results in a very thin (flat) form factor tabletop computing device.

Where the tabletop computing system uses FTIR to perform touch detection, the imaging system 111 may be used to detect the scattered light caused by touch events, or there may be a separate camera (e.g. an infra-red camera) which is also located below the switchable diffuser 504.

The computer hardware and software 112 shown in FIGS. 1, 4 and 5 comprises one or more processors 114 which may be microprocessors, controllers or any other suitable type of processors for processing computing executable instructions to control the operation of the device 100, 400, 500 in order to provide a multi-view display to users. In some examples, for example where a system on a chip architecture is used, the processors 114 may include one or more fixed function blocks (also referred to as accelerators) which implement a part of the method of operating the device in hardware (rather than software or firmware). Platform software comprising an operating system 116 or any other suitable platform software may be provided to enable application software 118 to be executed on the device.

The computer executable instructions may be provided using any computer-readable media that is accessible by the device 100, 400, 500. Computer-readable media may include, for example, computer storage media such as memory 120 and communications media. Computer storage media, such as memory 120, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 120) is shown within the computer hardware and software 112 it will be appreciated that the storage may be distributed or located remotely and accessed via a network or other communication link (e.g. using communication interface 122).

The computer hardware and software 112 also comprises a display interface 124 arranged to output display information to the display system 110. Separate display software 125 for generating the images displayed may be provided or this functionality may be integrated with the operating system 116 and/or application software 118. The surface computing device 100 may further comprise an input/output controller 126 which is arranged to receive and process input from the touch-sensitive surface 402 and again separate software 127 may be provided to perform touch detection or this functionality may be integrated with the operating system 116 and/or application software 118. The input/output controller 126 may also receive inputs from one or more other devices (e.g. a microphone, not shown in FIGS. 1, 4 and 5) and may also output data to one or more devices (e.g. a locally connected printing device, not shown in FIGS. 1, 4 and 5). Additionally, the computer hardware and software 112 may comprise an imaging interface 128 arranged to receive images captured by the imaging system 111. Separate imaging software 129 for processing the images received and changing the displayed images as a result of this may be provided or this functionality may be integrated with the operating system 116, application software 118 and/or display software 125.

As described above, each of the sequence of images displayed by the display system 110 is specific to the particular viewing position (e.g. image 1 corresponds to a user in position 1) and each user sees a different image (although some or part of the images projected for different viewing positions may be the same). In such an example, where there is a global image combined with view-specific images, a user may be able to interact with either or both the global image and their view-specific image through the touch-sensitive surface 402. In some embodiments, the imaging system 111 may be used to distinguish between touch events made by different users (e.g. by the detection of the arms of users and correlating this information with the position of touch events which are detected).

As described above, the imaging system 111 may be used to capture images through the diffuser layer when it is in its clear state (block 604 in FIG. 6) and the images captured may be used to change the images that are displayed (block 605). In one example, the imaging system 111 may capture lighting information and enable generation of an environment map (e.g. a 360° view of the room which is equivalent to having a 180° fisheye lens pointing towards the ceiling from the center of the table) which can then be used when rendering a 3D image to provide realism cues, e.g. the image may be altered so that portions are light and portions are in shadow according to the detected positions of light sources in the room in which the surface computing device is located, or the image may be altered to include realistic reflections, or the 3D image may be modified based on detection of objects in contact with or close to the surface. In such an example, the imaging system 111 may comprise one or more off axis cameras.

In another example, the imaging system 111 may be used to detect the positions of users around the surface so that the multi-view images can be shown at appropriate viewing positions, e.g. in the diagram 130 in FIG. 5, if it is detected that no one is sitting at position 4, the system may choose not to project images at this viewing position and this may be particularly useful in reducing the number of images which need to be rendered or projected (and hence the required computational load and speed of the projection system) where the sequence of images provides an auto-stereoscopic 3D display to users.

In other examples, the imaging system 111 may be used to track the positions of users around the surface computing device. This tracking may be used to detect if users change positions, e.g. so that, where user-specific data is displayed, the sequence of images displayed can be changed so that each user continues to see their user-specific data and not that of a user who was previously at their position around the table. Alternatively, the tracking of users may be used to detect when a new user arrives at the surface computing device so that information can be displayed to that user. In an example application, the surface computing device may be used to display a user-specific sequence of information to each user in addition to a main display, and this user-specific information may, for example, provide some commentary or explanation of the main display (e.g. in a museum). When a new user arrives, the sequence of information may be initiated for the user and the position of display of this information may track the user as they move around the surface computing device. When a second new user arrives, the sequence of information may be initiated again for that second new user and displayed at a viewing position which corresponds to the position (which may change) of that detected second new user.

The tracking of users may involve face recognition and where face recognition is performed, this may be used to automatically provide the correct personal content to the user at an appropriate viewing angle and which may be overlaid upon a global image which is displayed to all users irrespective of their viewing position.

In a further example, the imaging system 111 may be used to perform eye/head tracking of users to enable a 3D image being projected to be corrected to correspond with the detected vertical position of a user's eyes/head. This provides improved perspective and reality to the 3D imagery. The imaging system 111 may also be used to enable user control through detection of user gestures through the surface and for gaze control.

FIG. 8 is a schematic diagram of another surface or tabletop computing device which provides multiple views to users located anywhere around the device and which may be used to provide an auto-stereoscopic 3D surface computing experience to users. The device 810 comprises a touch-sensitive surface 402, a display system 110, an imaging system 111 and computing hardware and software 112. In this example, the diffuser layer and the rotatable view-angle restrictive filter are combined in a single rotatable element 800 which is within the tabletop surface 808 and in the embodiment shown in FIG. 8 is located behind the touch-sensitive surface 402.

FIG. 8 also shows two examples 801, 803 of the single rotatable element 800. In a first example 801, the single rotatable element comprises a portion 802 which is substantially clear (or transparent) and a portion 804 which is substantially diffuse, is rotatable about a central axis 806 and has a view-angle restrictive layer (e.g. privacy film) on its upper surface. In this example, the vanes/louvers of a view-angle restrictive filter (where such technology is used for the filter) may be arranged across the diameter or radius of the rotatable element. A view-angle restrictive filter which implements a multiple view direction (as opposed to a strict one view direction), such as a filter based on an orthogonal lenticular lens array, which provides different images in different directions, may form part of the first example 801 of a single rotatable element. In a second example 803, there is a different arrangement of substantially diffuse areas 810 and substantially clear areas 812 (in the form of small apertures in the diffuse areas, which may be as small as pinholes) and the arrangements shown in FIG. 8 are just two possible examples. In further examples, masks of other forms may be incorporated into rotating structure and any arrangement of clear and diffuse portions may be used. In some implementations, the view-angle restrictive layer may only be present in the segments 804 or areas 810 which are substantially diffuse.

Figure 9:
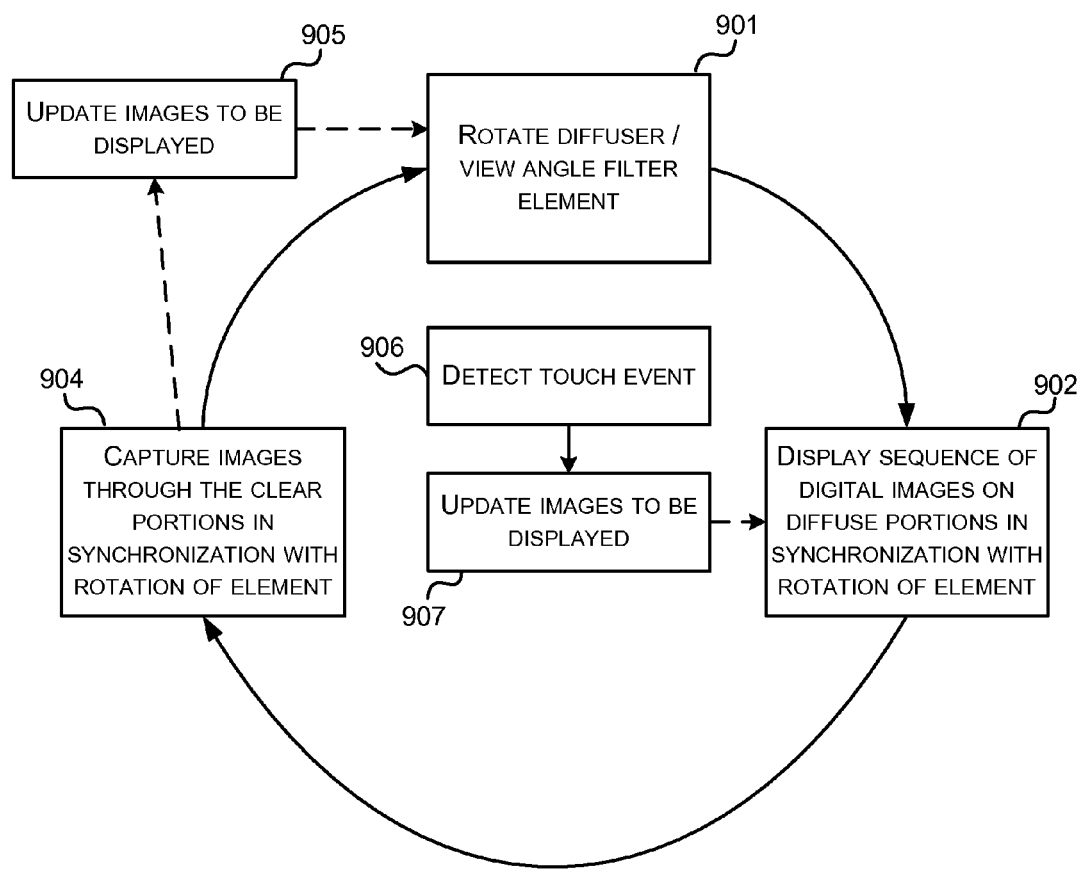
FIG. 9 is a flow diagram of another example method of operation of a tabletop computing device.

The operation of the surface computing device 810 shown in FIG. 8 can be described with reference to the flow diagram shown in FIG. 9. For simplicity of explanation, only four viewing positions 1-4 around the device 810 (as shown by the dotted arrows in FIG. 8) are described, although it will be appreciated that there may be any number of viewing positions and they may not be fixed in position. The element 800 is rotated (block 901) and as it is rotated, a sequence of images are projected onto diffuse portions 804, 810 of the element (block 902) and images are captured through clear portions 802, 812 (block 904) in synchronization with the rotation of the element. In an example, when the element 801 is in the orientation shown in FIG. 8, images are projected for viewing positions 2 and 4 and captured for positions 1 and 3. When the element has rotated by 90°, images are projected for viewing positions 1 and 3 and images are captured for positions 2 and 4. The process is repeated as the element rotates (in block 901) and by rotating the element 800 sufficiently fast to provide a refresh rate which is above the flicker threshold, a user may perceive a constant image without any flicker. As described in relation to FIGS. 5 and 6, the images captured (in block 904) are used to update the images displayed (block 905), although this updating may not be in real-time and may not be performed on each iteration of the method shown in FIG. 9. The images which are displayed may also be updated (in block 907) based on touch events which are detected (in block 906) on the touch-sensitive surface 402 (as described above with reference to FIG. 2).

Where the apertures in the diffuse areas of the rotating element 800 are only pinholes (e.g. as shown in example 803 but with smaller clear regions 812), the imaging system 111 may be used to capture light field camera input at different positions as the apertures rotate. These multiple images which may be collected from different directions may then be integrated computationally. This may, for example, enable selective focusing of the environment map.

In a variation of the system shown in FIG. 8, illumination may be provided underneath the rotating element 800 and used to provide varying (rotating) illumination of objects through the surface. This illumination may be linked to imaging the objects (using imaging system 111) or may be provided for an alternative purpose.

In another variation of the system shown in FIG. 8, the view-angle restrictive filter 106 and the diffuser layer may not be combined into a single element but may both be rotated (e.g. about the same axis but at different speeds). In such an example, the diffuser layer may comprise transparent areas and diffuse areas, similar to examples 801, 803 in FIG. 8.

In a further example of a surface or tabletop computing device which provides multiple views to users located anywhere around the device and which may be used to provide an auto-stereoscopic 3D surface computing experience to users, the switchable diffuser layer 504 and rotatable restrictive view-angle filter 106 may be combined in an element which can be mechanically rotated, can be switched between a substantially diffuse state and a substantially transparent state and which has a coating (e.g. privacy film) which provides the restrictive view-angle filter. Such a surface computing device operates substantially as described above with reference to FIGS. 6 and 7.

Figure 10:
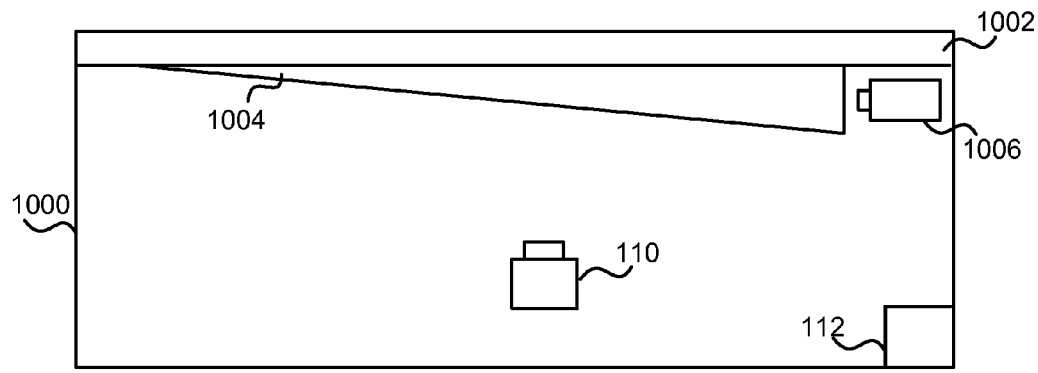

FIG. 10 is a schematic diagram of another surface or tabletop computing device which provides multiple views to users located anywhere around the device and which may be used to provide an auto-stereoscopic 3D surface computing experience to users. This device 1000 comprises a tabletop surface 1002 which may be as in any of the examples described above (e.g. 108, 408, 508, 808 from FIGS. 1, 4, 5 and 8). The device 1000 also comprises a display system 110 and computing hardware and software 112. In this example, the imaging system uses wedge shaped optics 1004, such as the Wedge® developed by CamFPD, to produce a more compact device. A camera 1006 images through the wedge shaped optics 1004. The operation of such a device may be as described above with reference to FIG. 6 or 8. In a variation of that shown in FIG. 10, the display system 110 may, in addition, or instead, make use of wedge shaped optics (e.g. where the display system comprises a projection system). Where both the projection and imaging use the wedge shaped optics, the device can be made very compact.

Although in the examples above, the display system is described as projecting images onto the diffuser layer when it is in a diffuse state (or onto a diffuse portion of this layer), where the display system comprises a projection system, the projection system may in addition be used to project images through the diffuser layer in its clear state (or through a clear portion), for example, to project images onto objects located on or near the surface with the view-restrictive filter 106 enabling view-specific projection through the surface.

In any of the examples described above, the efficiency of the display may be improved through use of 'turning film' which forces collimated light to turn in a specific direction. By aligning the view-angle restrictive filter 106 and the turning film (which may, for example, be attached to the filter 106), light which is not traveling in the correct direction to pass through the filter 106 can be turned so that it will pass through the filter rather than simply being lost in the filter. In examples, such as those shown in FIG. 8, where the view-angle restrictive filter 106 and diffuser layer are combined into a single element 800, the turning film may be restricted to those areas 804, 810 which are diffuse.

Although many of the present examples are described and illustrated herein as being implemented in a surface or tabletop computing system, the system described is provided as an example and not a limitation. As those skilled in the art will appreciate, the present examples are suitable for application in a variety of different types of computing systems and the system may alternatively be implemented as a touch-sensitive tabletop display with the processor, memory etc (e.g. element 112) located remotely from the display (e.g. similar to that shown in FIG. 1).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A device comprising:
 a substantially horizontal tabletop surface;
 a rotatable view-angle restrictive filter behind the tabletop surface and arranged to be rotated, in use, in a plane parallel to the tabletop surface, the rotatable view-angle restrictive filter comprising a plurality of closely packed tubes, each tube being held at one end in an upper plane and at another end in a lower plane and wherein the view-angle of the filter can be rotated in use by moving the lower plane and upper plane in a circular motion with respect to each other; and
 a display system adapted to display view-specific images in synchronization with the rotation of the view-angle restrictive filter.

2. A device according to claim 1, wherein the device is a tabletop computing device for multiple users, the tabletop surface comprises a touch-sensitive surface adapted to enable user input to the computing device and wherein the device further comprises:
 a processor arranged to control the operation of the display system and to update the images displayed based on user input.

3. A device according to claim 2, wherein the processor is further arranged to track users moving around the tabletop computing device and to change an angular position at which images are displayed to correspond with tracking of a user.

4. A device according to claim 2, wherein the processor is further arranged to change the images displayed to correct for a detected vertical position of users with respect to the tabletop computing device.

5. A device according to claim 1, further comprising:
 an imaging system adapted to capture images through the tabletop surface,
 and wherein the processor is further arranged to update the images displayed based on images captured by the imaging system.

6. A device according to claim 5, wherein the imaging system is arranged to capture images of the environment around the tabletop computing device.

7. A device according to claim 1, further comprising a diffuser layer and wherein the display system is adapted to display view-specific images on the diffuser layer in synchronization with the rotation of the view-angle restrictive filter.

8. A device according to claim 7, wherein the diffuser layer comprises a switchable diffuser layer having a diffuse mode and a transparent mode, the device further comprising:
 an imaging system adapted to capture images through the switchable diffuser layer in transparent mode,
 and wherein the processor is further arranged to update the images displayed based on images captured by the imaging system.

9. A device according to claim 8, wherein the switchable diffuser layer and the rotatable view-angle restrictive filter are combined in a single element.

10. A device according to claim 1, wherein the view-specific images are arranged to provide at least one of an auto-stereoscopic 3D display and personalized content to users.

11. A method of operating a device comprising a tabletop surface, a diffuser layer, a view-angle restrictive filter and a display system, the method comprising:
 rotating the view-angle restrictive filter in a plane parallel to the tabletop surface, the view-angle restrictive filter comprising a plurality of tubes, each tube being held at one end in an upper plane and at another end in a lower plane, rotating the view-angle restrictive filter including moving the lower plane and upper plane in a circular motion with respect to each other; and displaying a sequence of images on the diffuser layer in synchronization with the rotation of the filter to provide view-specific images to users.

12. A method of operating a device according to claim 11, the tabletop surface comprising a touch-sensitive surface and the method further comprising:

detecting a touch event on the touch-sensitive surface; and
updating the images to be displayed based on the detected touch event.

13. A method of operating a device according to claim 11, wherein the device further comprises a diffuser layer and the sequence of images are displayed on the diffuser layer.

14. A method of operating a device according to claim 13, the tabletop surface comprising a touch-sensitive surface, the diffuser layer comprising switchable diffuser having a diffuse mode and a transparent mode, the device further comprising an imaging system, wherein the method further comprises:

switching the diffuser layer into the diffuse mode before displaying the images on the diffuser layer;
switching the diffuser layer into the transparent mode;
capturing an image through the diffuser layer; and
updating the images to be displayed based on at least one of a detected touch event and the captured image.

15. A method of operating a device according to claim 11, wherein the sequence of images present at least one of an auto-stereoscopic 3D image and personalized content to each of one or more users located around the device.

16. A surface computing device comprising:

a touch-sensitive surface adapted to enable user input to the computing device;

a diffuser layer electrically switchable between a diffuse mode and a transparent mode;

a mechanically rotatable view-angle restrictive filter between the touch-sensitive surface and the diffuser layer and arranged to be rotated, in use, in a plane parallel to the touch-sensitive surface, the mechanically rotatable view-angle restrictive filter including a plurality of tubes, each tube being held at one end in an upper plane and at another end in a lower plane, the view-angle of the filter being rotatable by moving the lower plane and upper plane in a circular motion with respect to each other;

a display system adapted to display view-specific images on the diffuser layer in its diffuse mode in synchronization with the rotation of the view-angle restrictive filter;

an imaging system adapted to capture images beyond the surface through the diffuser layer in transparent mode; and a processor arranged to control the operation of the projection system and to update the images displayed based on user input and images captured by the image system.

17. A surface computing device according to claim 16, wherein the display system comprises a projection system.

18. A surface computing device according to claim 16, wherein the view-specific images are arranged to provide at least one of an auto-stereoscopic 3D display and personalized content to users.

19. A device according to claim 1, wherein the view-specific images include one or more game pieces being displayed to a first location and not displayed to a second location.

20. A device according to claim 1, wherein the view-specific images include a presentation, the display system being further adapted to relocate the display of the presentation in accordance with a change of location of the user.

* * * * *